United States Patent
Che et al.

(10) Patent No.: US 12,105,666 B2
(45) Date of Patent: Oct. 1, 2024

(54) MASTER-SLAVE COMMUNICATION WITH SUBDOMAINS

(71) Applicants: Advanced Micro Devices, Inc., Santa Clara, CA (US); ATI TECHNOLOGIES ULC, Markham (CA)

(72) Inventors: Shijie Che, Markham (CA); Wentao Xu, Markham (CA); Randall Brown, Markham (CA); Vaibhav Amarayya Hiremath, Bengaluru (IN); Manuchehr Taghi-Loo, Markham (CA)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 0 days.

(21) Appl. No.: 17/234,191

(22) Filed: Apr. 19, 2021

(65) Prior Publication Data

US 2022/0335003 A1    Oct. 20, 2022

(51) Int. Cl.
G06F 9/38         (2018.01)
G06F 15/177     (2006.01)
H04L 41/0893   (2022.01)

(52) U.S. Cl.
CPC ......... G06F 15/177 (2013.01); G06F 9/3877 (2013.01); H04L 41/0893 (2013.01)

(58) Field of Classification Search
CPC ........ G06F 15/177; G06F 9/3877; G06F 9/50; H04L 61/4511; H04L 41/08; H04L 41/0803; H04L 41/0893
See application file for complete search history.

(56) References Cited

U.S. PATENT DOCUMENTS

| | | | | |
|---|---|---|---|---|
| 7,299,265 B2 * | 11/2007 | Chatterjee | ........... | H04L 41/5054 709/208 |
| 10,997,538 B1 * | 5/2021 | Chandrachood | ............................ | G06Q 10/06312 |
| 2002/0147871 A1 * | 10/2002 | Koike | ................. | G06F 13/3625 710/107 |
| 2005/0063313 A1 * | 3/2005 | Nanavati | ............... | H04W 92/02 370/254 |
| 2008/0270650 A1 | 10/2008 | Toro | | |
| 2009/0043988 A1 * | 2/2009 | Archer | .............. | G06F 15/17337 712/31 |
| 2013/0151829 A1 * | 6/2013 | Amann | ................... | G06F 12/00 713/2 |
| 2015/0355989 A1 * | 12/2015 | Hayden | ............... | G06F 11/0793 714/56 |

(Continued)

OTHER PUBLICATIONS

Cote, "Implementation of Coarse-Grain Coherence Tracking Support in Ring-Based Multiprocessors", Master of Science Thesis, Queen's University, Oct. 31, 2007 (Oct. 31, 2007) retrieved online: https://qspace.library.queensu.ca/bitstream/handle/1974/882/Cote_Edmond_A_200710_MSc.pdf.

(Continued)

*Primary Examiner* — Boris D Grijalva Lobos (57) ABSTRACT

A computing system may implement a method for creating a first subdomain by configuring one of a first plurality of slave nodes as a first subdomain master node and configuring one or more other slave nodes of the first plurality of slave nodes as first subdomain slave nodes to the first subdomain master node.

20 Claims, 8 Drawing Sheets

(56) References Cited

U.S. PATENT DOCUMENTS

| | | | |
|---|---|---|---|
| 2015/0356049 A1* | 12/2015 | Bacha | G06F 13/4221 |
| | | | 710/110 |
| 2016/0055114 A1 | 2/2016 | Freiwald et al. | |
| 2016/0217006 A1 | 7/2016 | Trippi et al. | |
| 2016/0241443 A1* | 8/2016 | Bidaralli | H04L 41/0889 |
| 2017/0339005 A1* | 11/2017 | Yuan | H04L 41/0668 |
| 2018/0107621 A1* | 4/2018 | Sanghai | G06F 13/24 |
| 2020/0272526 A1* | 8/2020 | Bhole | G06F 11/3409 |
| 2021/0240646 A1* | 8/2021 | Robertson | G06F 9/546 |
| 2021/0357347 A1* | 11/2021 | Li | G06F 13/404 |
| 2022/0326994 A1* | 10/2022 | Mueller | G06F 21/6218 |

OTHER PUBLICATIONS

International Search Report and Written Opinion, Application No. PCT/IB2022/051944 dated May 19, 2022.
International Preliminary Report on Patentability issued in Application No. PCT/IB2022/051944, mailed Nov. 2, 2023, 5 pages.

* cited by examiner

MASTER-SLAVE COMMUNICATION WITH SUBDOMAINS

BACKGROUND

Master-slave is a model of communication and control where one device or process called the "master" controls one or more other devices or processes called the "slaves." In some systems, a master is selected from a group of eligible devices or nodes with the other devices or nodes acting as slaves. For example, see master-slave system 100, including master node 102 and slave node 104 of FIG. 1. In the illustrated example, each of the nodes 102-104 includes n registers.

Figure 1:
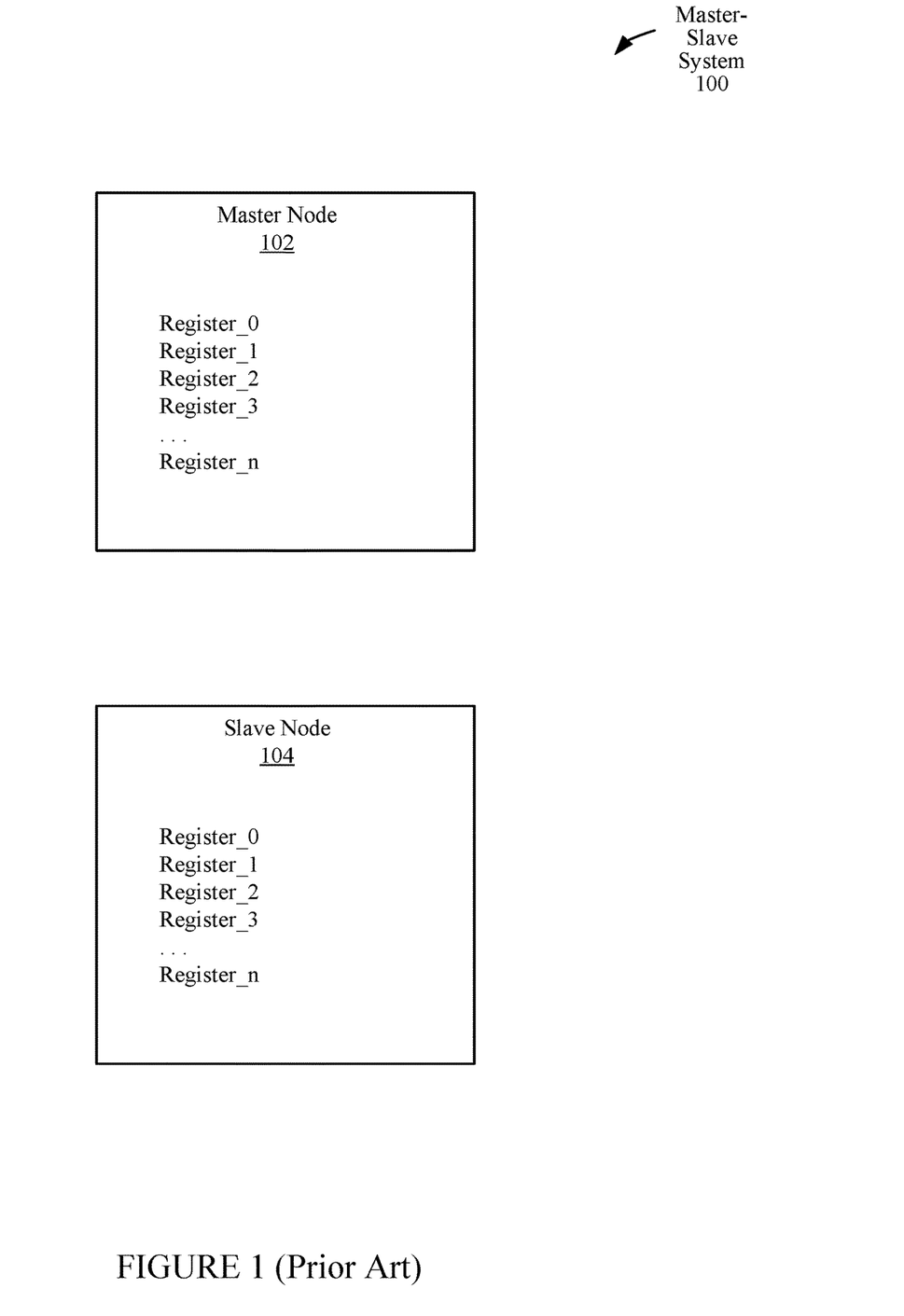
FIG. 1 is a prior art illustration of a conventional master-slave system.

It is common in the computer/processor industry to utilize master/slave processes at various system nodes to execute tasks, such as boot tasks, data storage tasks, and so on. The conventional master/slave model allows for one node to work as a master node, (e.g., master node 102) to initiate requests or tasks to slave nodes (e.g., slave node 104). The slave node(s) respond to the requests from the master node and do not initiate requests or respond to each other.

BRIEF DESCRIPTION OF THE DRAWINGS

The present disclosure is illustrated by way of example, and not by way of limitation, in the figures of the accompanying drawings.

DETAILED DESCRIPTION

The following description sets forth numerous specific details such as examples of specific systems, components, methods, and so forth, in order to provide a good understanding of the embodiments. It will be apparent to one skilled in the art, however, that at least some embodiments may be practiced without these specific details. In other instances, well-known components or methods are not described in detail or are presented in a simple block diagram format in order to avoid unnecessarily obscuring the embodiments. Thus, the specific details set forth are merely exemplary. Particular implementations may vary from these exemplary details and still be contemplated to be within the spirit and scope of the embodiments.

Computer systems and devices of all types often include clusters of nodes that need to intercommunicate to complete tasks. These clusters often use a master-slave protocol to assign and execute tasks. However, the slave nodes can only communicate with a master in one domain and cannot directly communicate with each other. Therefore, most of the cluster tasks are orchestrated by a global master node in a single domain, thus decreasing performance and efficiency.

In one embodiment, the cluster tasks may be executed in parallel or concurrently in separate subdomains without intervention from the global master node. Tasks may be scheduled to run at subdomain level or nested subdomain level and scale quickly on clusters of any size. Systems utilizing a master-slave architecture may benefit from running subdomains, particularly in parallel, since compute times and complexity are equivalent to a single unit of subdomain task command execution.

Figure 2:
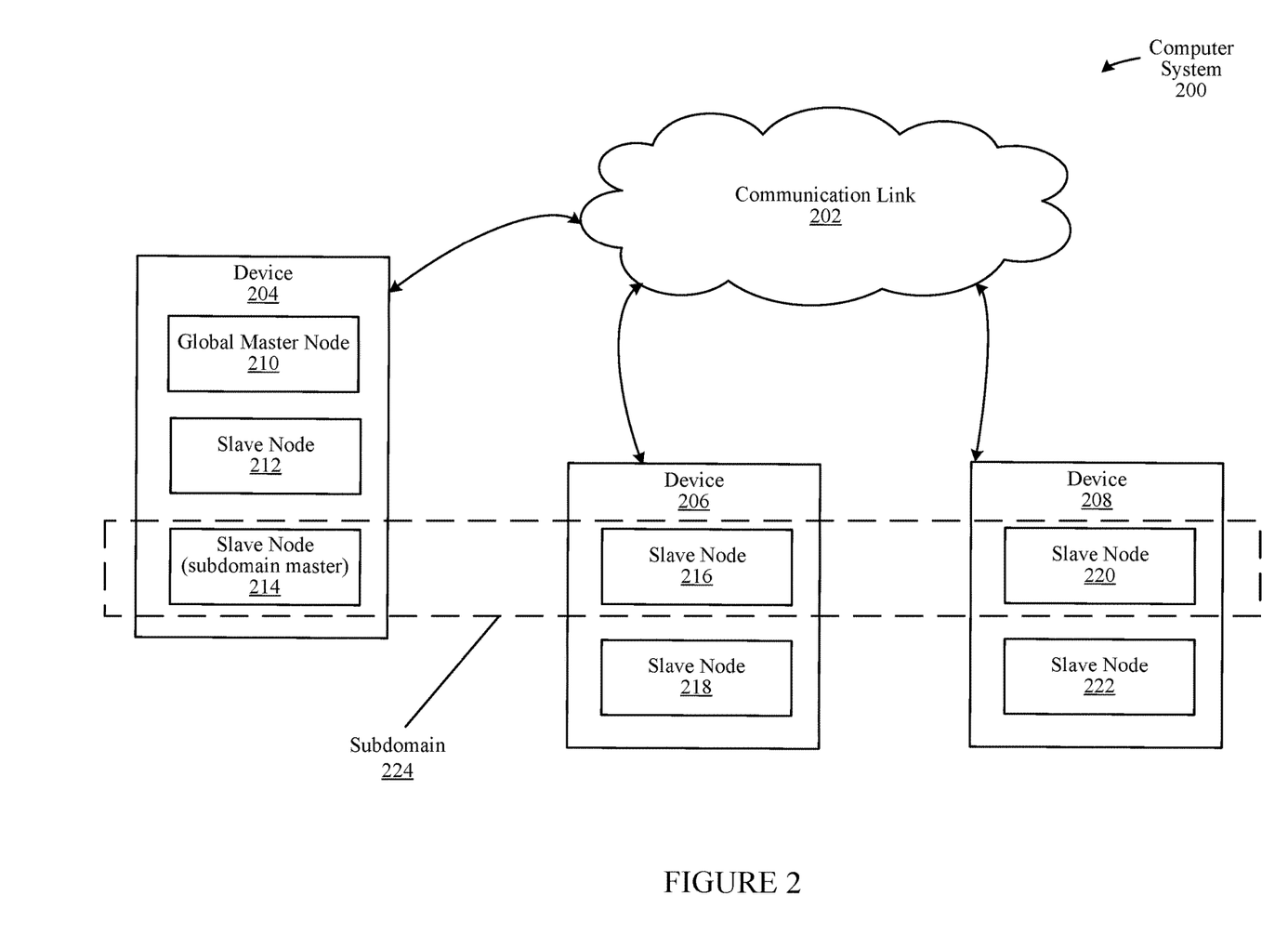
FIG. 2 illustrates an embodiment of a computer system in which a master-slave subdomain system is implemented.

FIG. 2 illustrates an embodiment of a computer system 200 in which a master-slave subdomain system is implemented. Computer system 200 includes a communication link 202 communicatively coupled to device 204, device 206 and device 208. In various embodiments, each of the devices 204, 206, and 208 may be any device communicatively coupled together over a bus or a network and that supports master-slave communication and protocols. Example devices may include a variety of forms of both physical computer hardware components (such as central processing unit (CPU) and graphics processing unit (GPU) cores, dies, sockets, platforms, and clusters of them), logical software artifacts (such as software processes and threads), and so forth. The communication link 202 may be any type of communication media mechanism, physical and/or logical, that supports communication between each device and each node, such as any type of hardware-based registers, memories, storage, data fabric, control fabric, networks of these, and/or software-based artifacts (eg., Operating System files, pipes, and sockets, etc.). For example, the link 202 may be implemented using peripheral component interconnect express (PCIe)) or other mechanism.

Device 204 includes a global master node 210, a slave node 212, and a slave node 214. The global master node 210 is configured to control and communicate with its slave nodes 212 and 214, slave nodes 216 and 218 of device 206, and slave nodes 220 and 222 of device 208. For example, global master node 210 may send requests and receive responses, such as instruction data in the form of commands, flag values, arguments, and parameters to and from slave node 216 and slave node 220 over the communication link 202.

In one embodiment, global master node 210 sends instruction data to slave node 214, slave node 216, and slave node 220 to enter a subdomain, such as subdomain 224. The instruction data may be unique to each slave node and designates one of the slave nodes to be the subdomain master node, such as slave node 214. The instruction data further configure the other slave nodes 216 and 220 to be subdomain slave nodes and respond to instruction data (e.g., flag values, task commands, and arguments) from the subdomain master node (slave node 214). In one embodiment, once each subdomain slave node completes its assigned tasks, each exit the subdomain and revert control back to the global master node 210.

Figure 3:
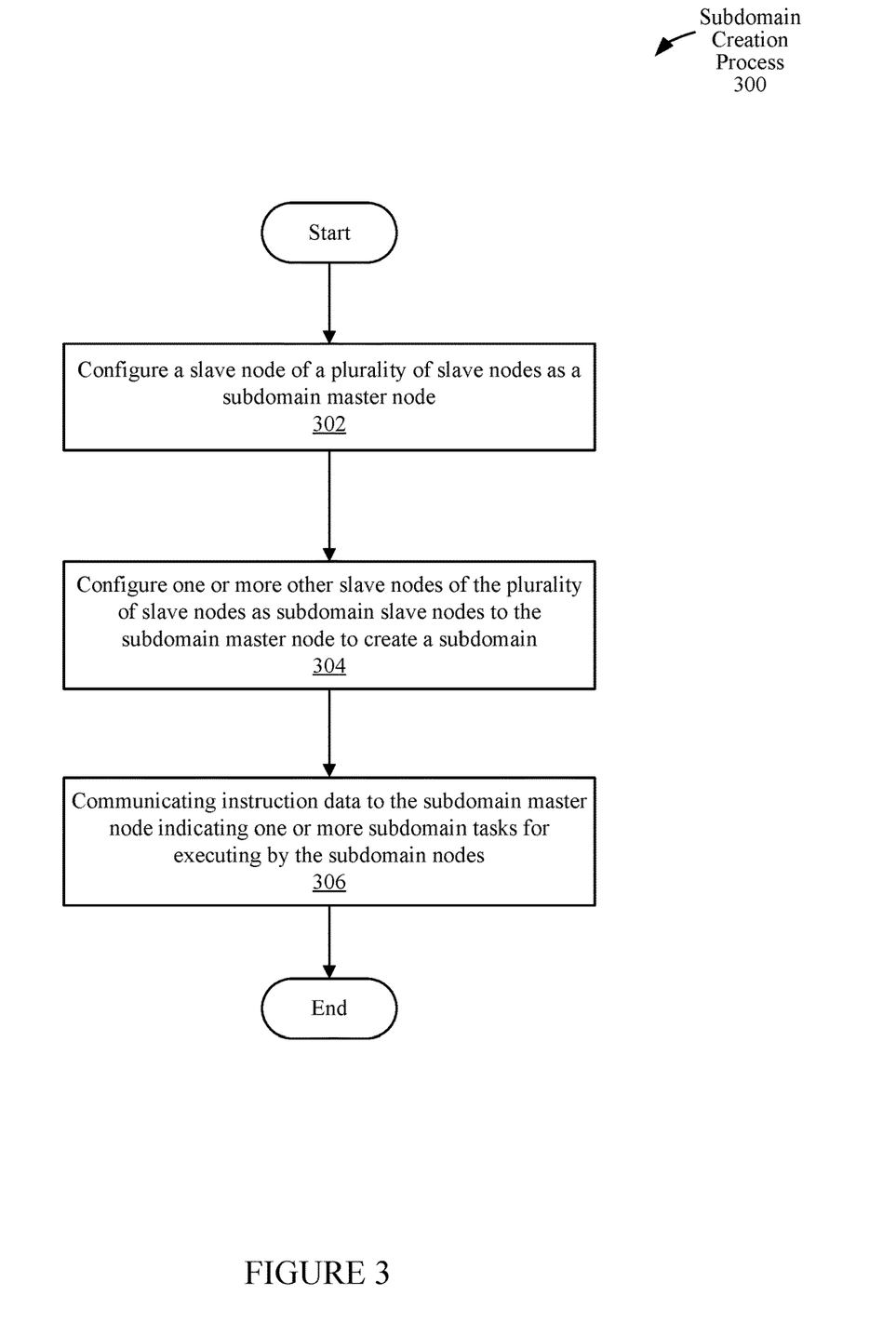
FIG. 3 illustrates an embodiment of a subdomain creation process 300 that may be executed by various master-slave capable devices and components of a system, such as system.

FIG. 3 illustrates an embodiment of a subdomain creation process 300 that may be executed by various master-slave capable devices and components of a system, such as computer system 200. To create a subdomain, beginning at block 302, a global master node (e.g., global master node 210 of FIG. 2) communicatively coupled with a plurality of slave nodes configures a slave node (e.g., slave node 214) to be a subdomain master node. Next, at block 304, the global master node configures one or more other slave nodes as subdomain slave nodes (e.g., slave nodes 216 and 220) to the subdomain master node. The subdomain master node and the subdomain slave nodes have entered and formed the subdomain (e.g., subdomain 224). In one embodiment, subdomain master roles (created at block 302) and subdomain slave roles (created at block 304) can be created sequentially as depicted in FIG. 3 (e.g., in unicast communication modes). Alternatively, the subdomain master and subdomain slave roles can be formed in parallel (e.g., in broadcast or multicast communication modes). At block 306, the global master node communicates one or more subdomain tasks to be performed by the nodes in the subdomain. In one embodiment, the tasks may be indicated in instruction data that is communicated to the subdomain master node during the subdomain formation process. In one embodiment, the subdomain master node subsequently assumes the role of master in its subdomain and issues commands to its subdomain's slave nodes to execute the subdomain tasks without further involvement from the global master.

In one embodiment, the global master node 210 may itself serve as the subdomain master rather than assigning the role to a slave node. In various embodiments, the instruction data to execute tasks may be scheduled autonomously by the subdomain master node after formation of the subdomain. In another embodiment, the instruction data is included as pre-defined tasks when the subdomain master node and subdomain slave nodes are configured, as discussed in detail below with respect to FIG. 4.

Figure 4:
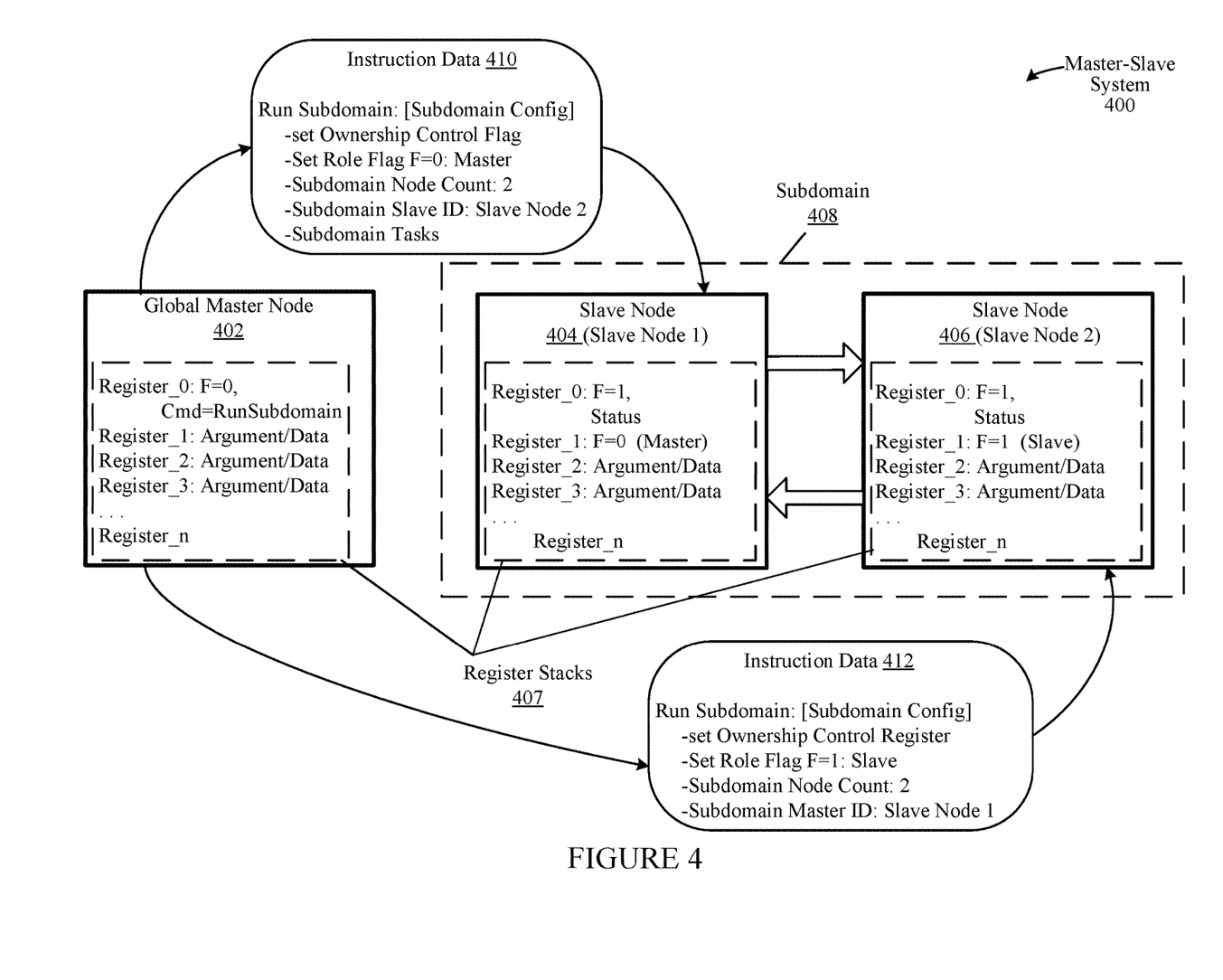
FIG. 4 illustrates an embodiment of a master-slave system that creates a subdomain using registers configured as master-slave nodes.

FIG. 4 illustrates an embodiment of a master-slave system 400 that creates a subdomain using registers configured as master-slave nodes. Master-slave system 400 includes global master node 402, slave node 404, and slave node 406. For simplicity, two slave nodes are shown in communication with global master node 402, however, in other embodiments, global master node 402 may configure a multitude of slave nodes to operate in one or more than one subdomain.

In one embodiment, each node includes communication channels, which may be a cluster of registers in a register stack to hold commands, arguments, and data to execute tasks within the master-slave system 400. For example, see register stacks 407, that include registers 0 through n in each node. When the master-slave system 400 is not in subdomain mode the global master node 402 controls each communication channel in each register stack to communicate instruction data, such as flag values, commands, arguments data, and so on, within the master-slave system 400. In one embodiment, register_0 of the register stacks 407 is used as an ownership control register flag ("F") to indicate the current ownership of the cluster of communication channels of register stacks 407. For example "F=0" in register_0 indicates ownership of the communication channels by the master (e.g., global master node 402 for non-subdomain operation) while "F=1" indicates ownership by a slave node operating as a regular slave node for non-subdomain operations, or either a subdomain master node or subdomain slave node for subdomain operations, discussed in further detail below.

In one embodiment, to create subdomain 408, the global master node 402 selects a set of slave nodes, such as slave node 404 and slave node 406 to enter into the subdomain 408. The global master node 402 sends a subdomain command (e.g., Run_Subdomain) that sets slave node 404 and slave node 406's ownership control register flag to 1 (e.g., register_0: F=1), effectively transferring the control of communication between the slave nodes from the global master node 402 to the slave nodes 404 and 406. In one embodiment, this may be done by transferring ownership of each slave nodes' mailbox register block (not shown) to the slave nodes.

Passed with the subdomain command is subdomain configuration data as shown in instruction data 410 and instruction data 412. This may include at least a node's role as either subdomain master or subdomain slave, the number of nodes in the subdomain (e.g., subdomain 408), and a list of node identifiers in the subdomain. For example, instruction data 410 running the subdomain command are communicated to the slave node 404. This includes setting one or more registers (e.g., ownership control flag value, role flag value, subdomain node count, and master slave identification) in slave node 404 to indicate communication control is between slave nodes (ownership control flag) and that it is the subdomain master node (role flag). Instruction data 410 additionally includes two as the number of nodes (subdomain node count) in the subdomain 408 (slave node 404 and 406), slave node 2 (slave node 406) as the other slave in subdomain 408 (subdomain slave ID), and one or more commands for the subdomain master node (slave node 404) to communicate to the subdomain slave node (slave node 406).

Instruction data 412 to the slave node 406 similarly includes a run subdomain command. This also includes setting registers (flags) to indicate communication control is between slave nodes (ownership control flag), but in this case sets the role flag of slave node 406 to be a subdomain slave node. The instruction data 412 further include the number of nodes (subdomain node count) in the subdomain 408 (slave node 404 and 406) and identify that slave node 1 (slave node 404) is the controlling subdomain master node (subdomain master ID).

In one embodiment, slave nodes 404 and 406 exit the subdomain 408 once all the task commands communicated from the subdomain master node (slave node 404) have been completed by the subdomain slave node (slave node 406). Slave node 404 and slave node 406 set their respective ownership control flags (register_0) back to 0 to indicate to the global master node 402 that it now may resume control of the communication channels of slave nodes 404 and 406 as global master.

Figure 5:
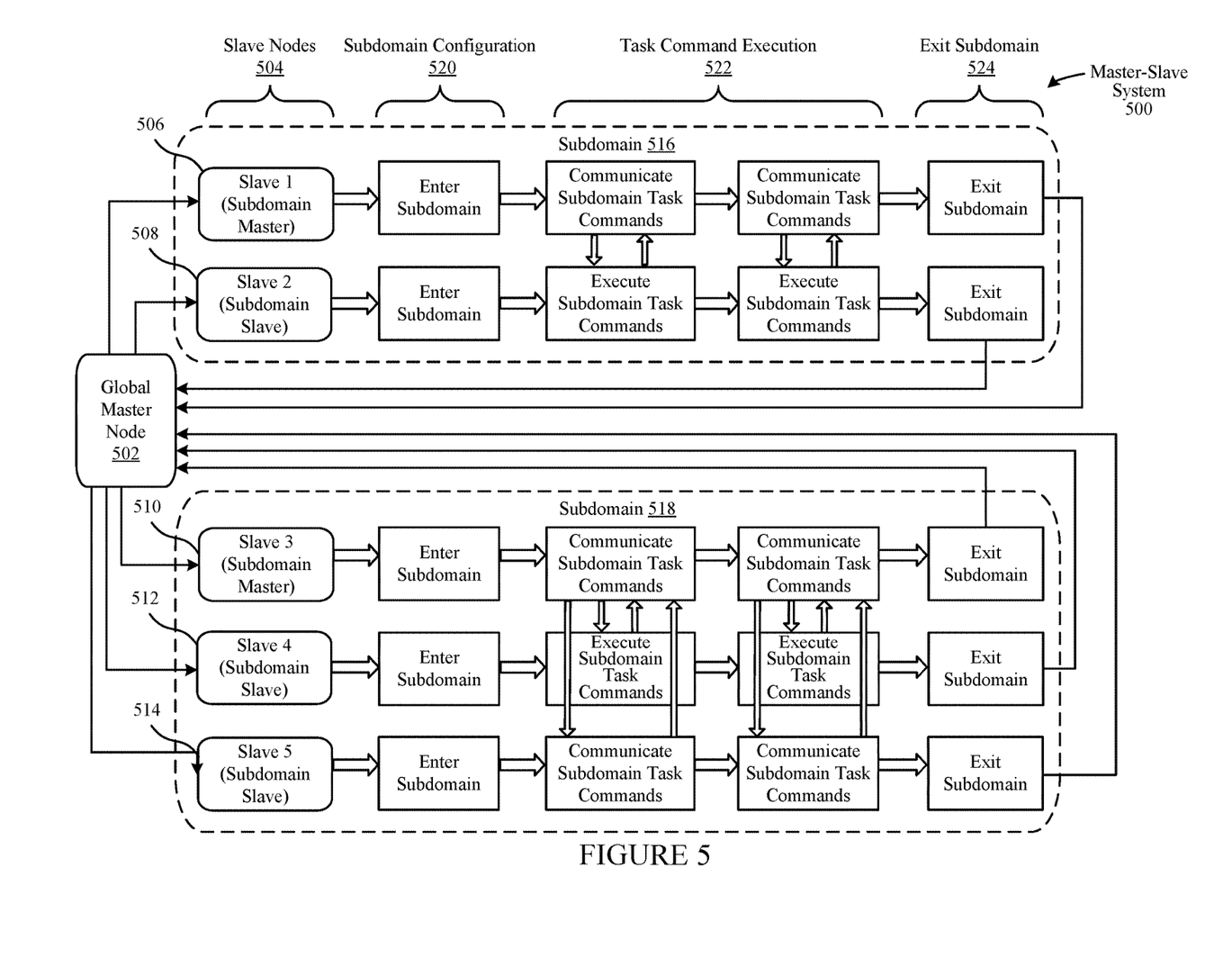
FIG. 5 illustrates an embodiment of a master-slave system that includes a flow diagram for the creation and use of two subdomains.

FIG. 5 illustrates an embodiment of a master-slave system 500 that includes a flow diagram for the creation and use of two subdomains. Master-slave system 500 includes a global master node 502 communicatively coupled to slave nodes 504. Slave nodes 504 include slave node 506, slave node 508, slave node 510, slave node 512, and slave node 514. In one embodiment, global master node 502 communicates a run subdomain command to the slave nodes 504 to create two subdomains to execute task commands in parallel and independently of each other.

Specifically, global master node 502 sends the run subdomain command to slave node 506 and 508 to configure slave node 506 as the subdomain master node and enter subdomain 516, as shown under subdomain configuration 520. Global master node 502 also sends the run subdomain command to slave node 510, 512 and 514 to configure slave node 510 as the subdomain master node and enter subdomain 518, as shown under subdomain configuration 520.

In one embodiment, the run subdomain command may include instruction data, such as configuration data via registers included in each node. For example, the configuration data may include at least a portion or all of an ownership control flag value, a role flag value, subdomain node count, subdomain slave identification, subdomain master identification, commands, argument data, and so on, as described with respect to instruction data 410 and 412 of FIG. 4.

In task command execution 522, the subdomain master node of each subdomain 516 and 518 (slave nodes 506 and 510, respectively) communicates subdomain task commands to their respective subdomain slave nodes (slave nodes 508 and slave nodes 512 and 514, respectively). The subdomains 516 and 518 act independently of each other and may execute in parallel increasing the efficiency of task command execution.

Upon completion of a subdomain's task command execution the subdomain exits, as shown under exit subdomain 524. Although subdomain 516 and 518's exit is shown together under exit subdomain 524 each subdomain exits independently and may exit at different times depending on task command execution. At exit subdomain 524, each subdomain's slave node (e.g., slave nodes 506-514), including the subdomain master nodes (e.g., slave nodes 506 and 510), returns control back to the global master node 502.

Figure 6:
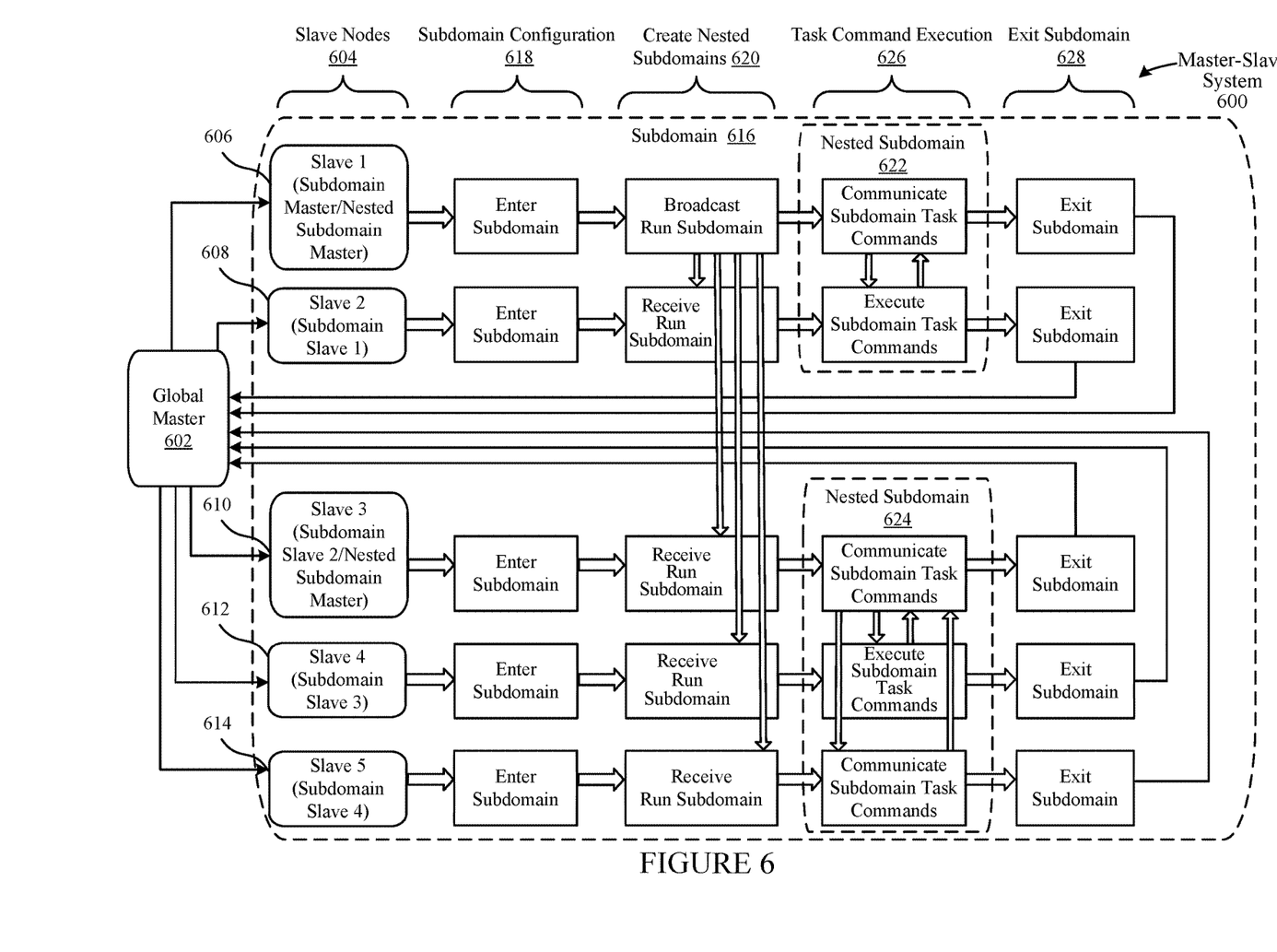
FIG. 6 illustrates an embodiment of a master-slave system that includes a flow diagram for the creation of a subdomain that includes nested subdomains.

FIG. 6 illustrates an embodiment of a master-slave system 600 that includes a flow diagram for the creation of a subdomain that includes nested subdomains. Master-slave system 600 includes a global master node 602 communicatively coupled to slave nodes 604. Slave nodes 604 includes slave node 606, slave node 608, slave node 610, slave node 612, and slave node 614. In one embodiment, global master node 602 communicates a run subdomain command to the slave nodes 604 to create a subdomain 616. Subsequently, two nested subdomains 622 and 624 are further created within the parent subdomain 616 to execute task commands independently of each other. Specifically, global master node 602 sends the run subdomain command to slave node 606 to configure the slave node 606 as the subdomain master node and enter subdomain 616, as shown under subdomain configuration 618.

The subdomain master (slave node 606) then broadcasts another run subdomain command at create nested subdomains 620 to the slave nodes of subdomain 616. This command instructs slave node 606 and 608 to enter nested subdomain 622 with the nested subdomain master as slave node 606, and slave nodes 610, 612, and 614 to enter nested subdomain 624 with slave node 610 as nested subdomain master. The nested subdomains work the same way as regular subdomains, by firstly entering and lastly exiting subdomains (not explicitly shown in 626) after executing their assigned task commands under task command execution 626. At exit subdomain 628, each subdomain's slave node (e.g., slave nodes 606-614), including the subdomain master node (e.g., slave node 606), returns control back to the global master node 502. In one embodiment, the slave nodes of the nested subdomains 622 and 624 do not need to exit distinctly from subdomain 616, for example, by setting their respective ownership control flags to the appropriate value, as discussed with respect to FIG. 4.

Figure 7:
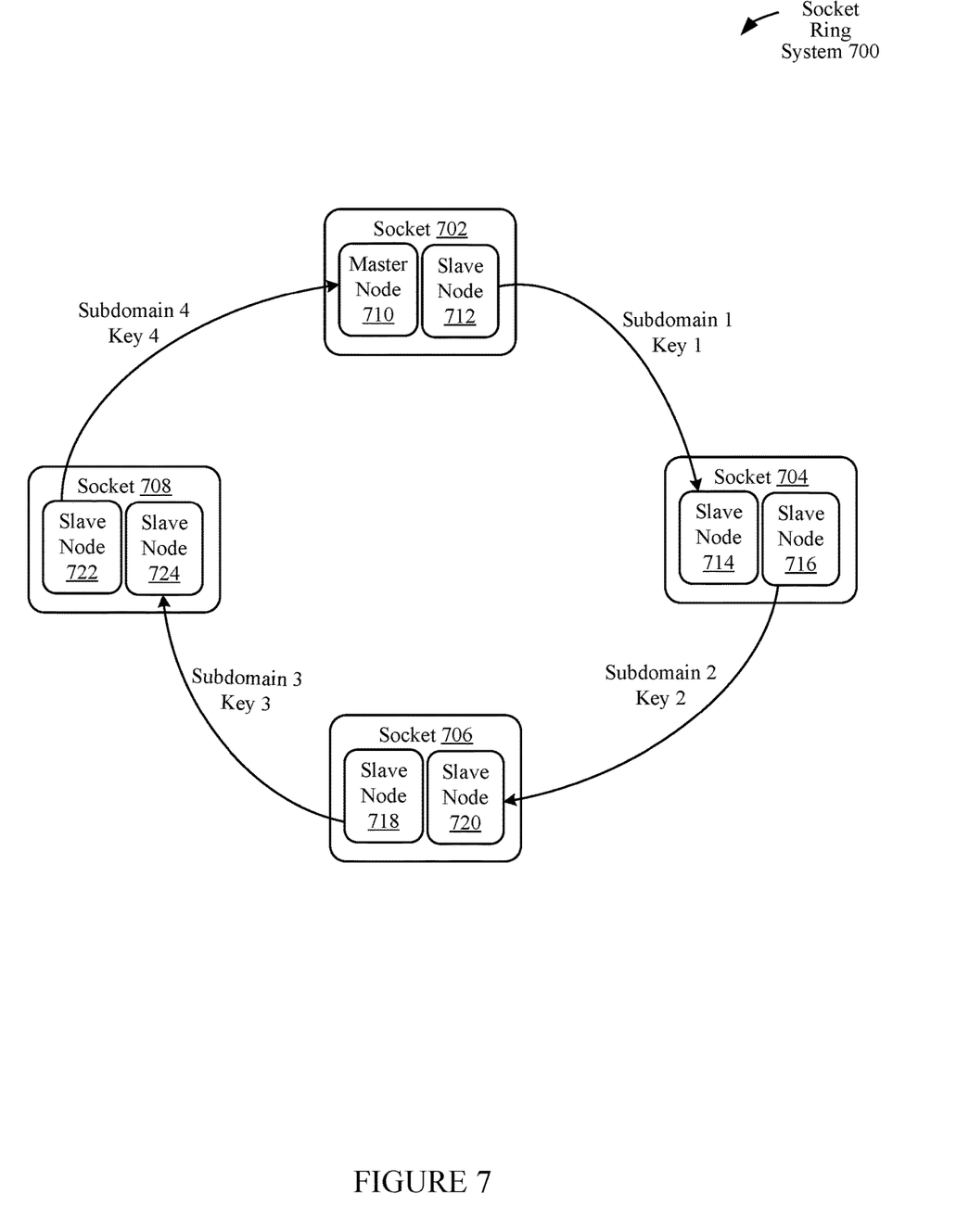
FIG. 7 illustrates an embodiment of a multi-chip multi-socket system connected in a ring topology that uses master-slave subdomains to exchange communication keys for socket-to-socket communication in a computer system.

FIG. 7 illustrates an embodiment of a multi-chip multi-socket system 700 connected in a ring topology that uses master-slave subdomains to exchange communication keys for socket-to-socket communication in a computer system. Each socket negotiates a communication key with each adjacent neighbor to secure the communication. For simplicity, each socket includes two nodes, however, the number of nodes over two is not limited.

In one embodiment, socket ring system 700 includes four sockets, sockets 702, 704, 706 and 708. Rather than negotiating the communication keys serially around the ring, the master node 710, may run four subdomains in parallel to set up communication keys 1-4 and reduce socket-to-socket communication set up time. For example, the master node 710 creates a first subdomain that includes connecting slave node 712 of socket 702 and slave node 714 of socket 704 to negotiate a first communication key, and a second subdomain that includes connecting slave node 716 of socket 704 and slave node 720 of socket 706 to negotiate a second communication key. Additionally, the master node 710 creates a third subdomain that includes connecting slave node 718 of socket 706 and slave node 724 of socket 708 to negotiate a third communication key, and a fourth subdomain that includes connecting slave node 722 of socket 708 and master node 710 of socket 702 to negotiate a fourth communication key.

Figure 8:
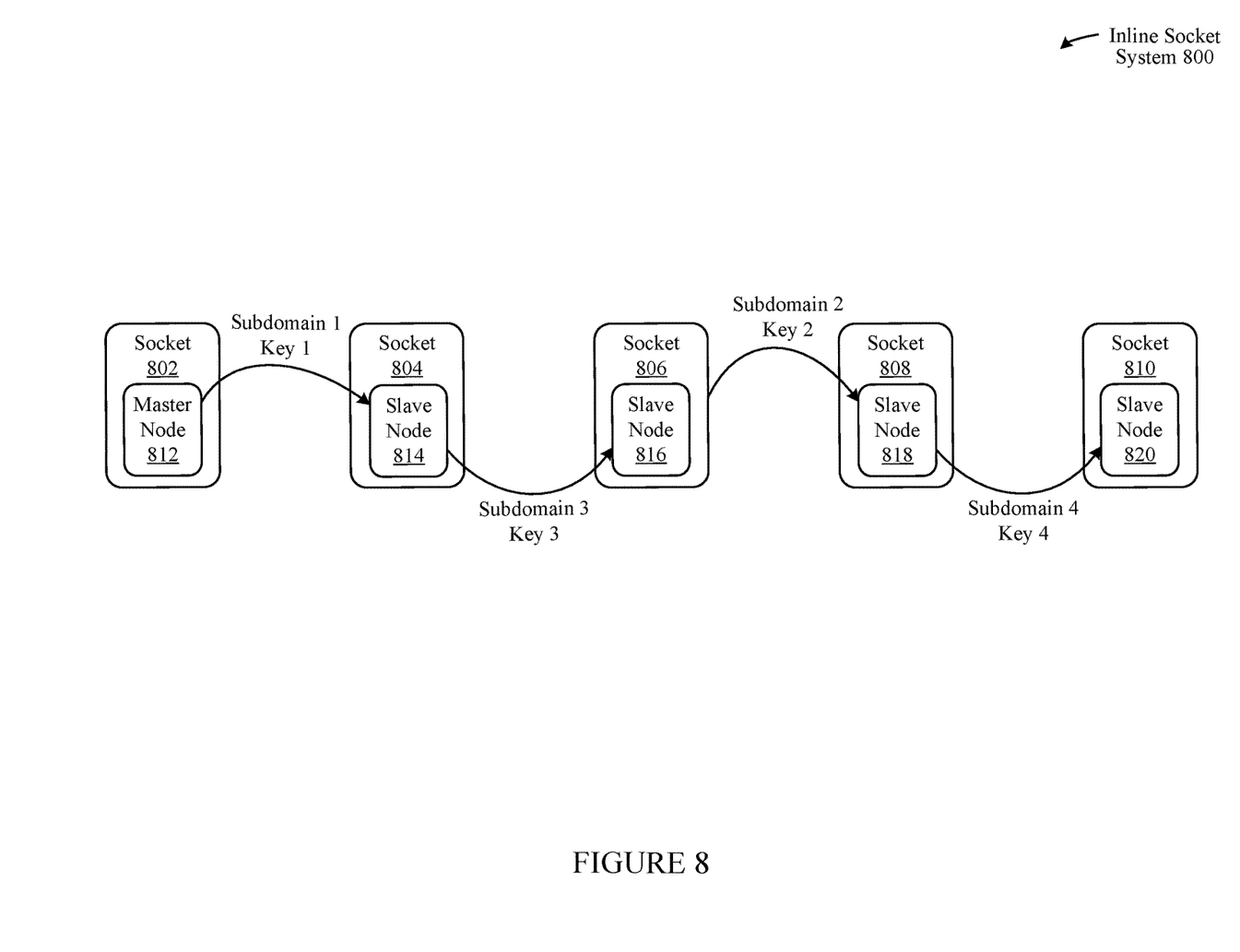
FIG. 8 illustrates an embodiment of a multi-socket system connected in a line topology that uses master-slave subdomains to exchange communication keys for socket-to-socket communication in a computer system.

FIG. 8 illustrates an embodiment of a multi-socket system 800 connected in a line-topology that uses master-slave subdomains to exchange communication keys for socket-to-socket communication in a computer system. Each socket negotiates a communication key with each adjacent neighbor to facilitate communication. In this embodiment, each socket includes a single node capable of establishing socket-to-socket communications. While a node, according to one embodiment, may be included in a nested subdomain, it is not included in two separate subdomains at the same time.

Therefore, the line-topology socket system 800 that includes five sockets, sockets 802, 804, 806, 808 and 810, will make two passes to create two distinct instances of two submains to negotiate four communication keys. For example, the first pass set up by the master node 812 includes a first subdomain connecting master node 812 of socket 802 with slave node 814 of socket 804 to negotiate a first communication key, and the second subdomain connecting slave node 816 of socket 806 and slave node 818 of socket 808 to negotiate a second communication key.

The second pass set up by the master node 812 includes a third subdomain connecting slave node 814 of socket 804 with slave node 816 of socket 806 to negotiate a third communication key, and a fourth subdomain connecting slave node 818 of socket 808 and slave node 820 of socket 810 to negotiate a fourth communication key.

One general aspect includes a method for creating a first subdomain by configuring one of a first plurality of slave nodes as a first subdomain master node and configuring one or more other slave nodes of the first plurality of slave nodes as first subdomain slave nodes to the first subdomain master node.

Implementations may include one or more of the following features. The method where the configuring of the first subdomain master node may include communicating instruction data to the first subdomain master node to communicate one or more subdomain tasks for executing by the first subdomain master node and the first subdomain slave nodes. Creating the first subdomain further may include communicating a first command to set a flag to a first value in a first register of the first subdomain master node to indicate communication channel ownership, and communicating a second command to set the flag to the first value in each of the first registers of the first subdomain slave nodes to indicate communication channel ownership, where the first command further may include data to identify the first subdomain slave nodes and the second command may include data to identify the subdomain master node. The method may further include resuming control of the first subdomain master node and the first subdomain slave nodes when each flag of each first register in the first subdomain master node and the first subdomain slave nodes is set to a second value, where the resuming of control indicates an exit from the first subdomain The method may include configuring a second plurality of slave nodes to create a second subdomain and configuring one of the second plurality of slave nodes as a second subdomain master node. The method may also include configuring a third plurality of slave nodes to create a third subdomain, configuring one of the third plurality of slave nodes as a third subdomain master node, and configuring the first subdomain for negotiating a first communication key, the second subdomain for negotiating a second communication key, and the third subdomain for negotiating a third communication key. The first subdomain includes the first subdomain master node from a first device and a first subdomain slave node from a second device, the second subdomain includes the second subdomain master node from the second device and a second subdomain slave node from a third device, and the third subdomain includes the third subdomain master node from the third device and a third subdomain slave node.

In the method, the configuring of the first subdomain for negotiating the first communication key, the second subdomain for negotiating the second communication key, and the third subdomain for negotiating the third communication key further includes configuring the first subdomain master node in the first subdomain for negotiating a first communication key for communications between the first device and the second device, configuring the second subdomain master node in the second subdomain and the second subdomain slave node in the second subdomain for negotiating the second communication key for communicating between the second device and the third device, and configuring the third subdomain master node in the third subdomain and the third subdomain slave node in the third subdomain for negotiating the third communication key for communicating between the third device and a fourth device.

The method also includes configuring a third plurality of slave nodes to create a third subdomain, configuring one of the third plurality of slave nodes as a third subdomain master node, configuring, in a first pass, the first subdomain for negotiating a first communication key and the second subdomain for negotiating a second communication key, and configuring, in a second pass the third subdomain for negotiating a third communication key. The first subdomain includes the first subdomain master node from a first device and a first slave node from a second device, the second subdomain includes the second subdomain master node from a third device and a second subdomain slave node from a fourth device, and the third subdomain includes the third subdomain master node from the second device and a third subdomain slave node from the third device.

The method may further include configuring two or more slave nodes of the first subdomain to create a nested subdomain, where a slave node of the nested subdomain is configured as a nested subdomain master node and the remaining nodes of the nested subdomain are nested subdomain slave nodes, and communicating instruction data from the nested subdomain master node to communicate one or more task commands to the nested subdomain slave nodes.

One general aspect includes a master-slave system. The master-slave system also includes a global master node coupled to a plurality of slave nodes, the global master node to configure one of a first plurality of slave nodes as a first subdomain master node and configure one or more other slave nodes of the first plurality of slave nodes as first subdomain slave nodes to the first subdomain master node. Other embodiments of this aspect include corresponding computer systems, apparatus, and computer programs recorded on one or more computer storage devices, each configured to perform the actions of the methods.

Implementations may include one or more of the following features. The master-slave system may include the subdomain master node to communicate instruction data including task commands to the first subdomain slave nodes to execute one or more tasks, and the global master node resumes control of the first subdomain master node and the first subdomain slave nodes after the execution of the one or more tasks. The global master node and each of the plurality of slave nodes may include a register stack, each register stack of each slave node configured to receive instruction data from the global master node, the instruction data may include at least one of an ownership control flag value, a role flag value, subdomain node count, subdomain slave identification and subdomain master identification. The global master node is further configured to configure a second plurality of slave nodes to create a second subdomain and configure one of the second plurality of slave nodes as a second subdomain master node.

The global master node configures a third plurality of slave nodes to create a third subdomain and configures one of the third plurality of slave nodes as a third subdomain master node, and configures the first subdomain to negotiate a first communication key, the second subdomain to negotiate a second communication key, and the third subdomain to negotiate a third communication key. The first subdomain includes the first subdomain master node from a first device and a first subdomain slave node from a second device, the second subdomain includes the second subdomain master node from the second device and a second subdomain slave node from a third device, and the third subdomain includes the third subdomain master node from the third device and a third subdomain slave node. To configure the first subdomain to negotiate a first communication key, the second subdomain to negotiate a second communication key, and the third subdomain to negotiate a third communication key, the global master node configures the first subdomain master node in the first subdomain to negotiate a first communication key for communications between the first device and the second device, configures the second subdomain master node in the second subdomain and the second subdomain slave node in the second subdomain for negotiating the second communication key for communicating between the second device and the third device, and configures the third subdomain master node in the third subdomain and the third subdomain slave node in the third subdomain for negotiating the third communication key for communicating between the third device and a fourth device.

The global master node is further configured to configure a third plurality of slave nodes to create a third subdomain, configure one of the third plurality of slave nodes as a third subdomain master node, configure, in a first pass, the first subdomain to negotiate a first communication key and the second subdomain to negotiate a second communication key, and configure, in a second pass, the third subdomain to negotiate a third communication key, where the first subdomain includes the first subdomain master node from a first device and a first subdomain slave node from a second device, the second subdomain includes the second subdomain master node from the third device and a second subdomain slave node from a fourth device, and the third subdomain includes the third subdomain master node from the second device and a third subdomain slave node from the third device. The first subdomain master node may configure two or more slave nodes of the first subdomain to create a nested subdomain, where one slave node of the nested subdomain is configured as a nested subdomain master node and the remaining nodes of the nested subdomain are nested subdomain slave nodes. The first subdomain master node may communicate instruction data to the nested subdomain master node to communicate one or more task commands to the nested subdomain slave nodes.

One general aspect includes a computer system. The computer system also includes a first device that may include a global master node coupled to a first plurality of slave nodes to create a first subdomain. The system may also include a global master node to configure a slave node of the first plurality of slave nodes as a first subdomain master node, and to configure one or more other slave nodes of the first plurality of slave nodes as first subdomain slave nodes to the first subdomain master node. Other embodiments of this aspect include corresponding computer systems, apparatus, and computer programs recorded on one or more computer storage devices, each configured to perform the actions of the methods.

Implementations may include one or more of the following features. The computer system may include a second device coupled to the first device, where the second device may include one or more slave nodes, and the global master node further configures one or more slave nodes of the second device as first subdomain slave nodes to the first subdomain master node. In the computer system, the global master node may be coupled to a second plurality of slave nodes, and may create a second subdomain by configuring one of the second plurality of slave nodes as a second subdomain master node, and configuring one or more other slave nodes of the second plurality of slave nodes as second subdomain slave nodes to the second subdomain master node.

The embodiments described herein may include various operations and processes. These may be performed by hardware components, software, firmware, or a combination thereof. As used herein, the term "coupled to" may mean coupled directly or indirectly through one or more intervening components. Any of the signals provided over various lines and buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The computer-readable storage medium may include, but is not limited to, magnetic storage medium (e.g., floppy diskette), optical storage medium (e.g., CD-ROM), magneto-optical storage medium, read-only memory (ROM), random-access memory (RAM), erasable programmable memory (e.g., EPROM and EEPROM), flash memory, or another type of medium suitable for storing electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Generally, a data structure representing the subdomain creation process 300 and/or portions thereof carried on the computer-readable storage medium may be a database or other data structure which can be read by a program and used, directly or indirectly, to fabricate the hardware for implementing the subdomain creation process 300. For example, the data structure may be a behavioral-level description or register-transfer level (RTL) description of the hardware functionality in a high-level design language (HDL) such as Verilog or VHDL. The description may be read by a synthesis tool which may synthesize the description to produce a netlist comprising a list of gates from a synthesis library. The netlist comprises a set of gates which also represent the functionality of the hardware for implementing the subdomain creation process 300. The netlist may then be placed and routed to produce a data set describing geometric shapes to be applied to masks. The masks may then be used in various semiconductor fabrication steps to produce a semiconductor circuit or circuits for implementing the subdomain creation process 300. Alternatively, the database on the computer-readable storage medium may be the netlist (with or without the synthesis library) or the data set, as desired, or Graphic Data System (GDS) II data.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the embodiments have been described with reference to specific exemplary embodiments thereof. It will, however, be evident that various modifications and changes may be made thereto without departing from the broader spirit and scope of the embodiments as set forth in the appended claims. The specification and drawings are, accordingly, to be regarded in an illustrative sense rather than a restrictive sense.

What is claimed is:

1. A method, comprising:

sending, by a global master node, instruction data to a first plurality of slave nodes in a domain to enter a first subdomain;

configuring, by the global master node, a slave node of the first plurality of slave nodes as a first subdomain master node;

configuring, by the global master node, one or more other slave nodes of the first plurality of slave nodes as first subdomain slave nodes to the first subdomain master node;

communicating, by the global master node, instruction data to the first subdomain master node for communicating one or more subdomain tasks for executing by the first subdomain slave nodes; and resuming, by the global master node, control of a slave node of the first subdomain slave nodes from the first subdomain master node responsive to the slave node completing one or more subdomain tasks assigned thereto by the first subdomain master node.

2. The method of claim 1, further comprising:
communicating a first command to set a flag in a first register of the first subdomain master node to a first value to indicate communication channel ownership; and
communicating a second command to set a flag in a first register of each of the first subdomain slave nodes to the first value to indicate the communication channel ownership,
wherein the first command comprises an identifier for each of the first subdomain slave nodes and the second command comprises an identifier for the first subdomain master node.

3. The method of claim 2, further comprising:
resuming, by the global master node, control of the first subdomain master node and the first subdomain slave nodes when the flag in the first register of the first subdomain master node and the flag in the first register of each of the first subdomain slave nodes are set to a second value, wherein the resuming of control indicates an exit from the first subdomain.

4. The method of claim 1 further comprising:
configuring a second plurality of slave nodes to create a second subdomain; and
configuring one of the second plurality of slave nodes as a second subdomain master node.

5. The method of claim 4, further comprising:
configuring a third plurality of slave nodes to create a third subdomain;
configuring one of the third plurality of slave nodes as a third subdomain master node; and
configuring the first subdomain for negotiating a first communication key, the second subdomain for negotiating a second communication key, and the third subdomain for negotiating a third communication key,
wherein the first subdomain includes the first subdomain master node from a first device and a first subdomain slave node from a second device, the second subdomain includes the second subdomain master node from the second device and a second subdomain slave node from a third device, and the third subdomain includes the third subdomain master node from the third device and a third subdomain slave node from a fourth device.

6. The method of claim 5, wherein the configuring of the first subdomain for negotiating the first communication key, the second subdomain for negotiating the second communication key, and the third subdomain for negotiating the third communication key comprises:
configuring the first subdomain master node in the first subdomain for negotiating the first communication key for communicating between the first device and the second device;
configuring the second subdomain master node and the second subdomain slave node in the second subdomain for negotiating the second communication key for communicating between the second device and the third device; and
configuring the third subdomain master node and the third subdomain slave node in the third subdomain for negotiating the third communication key for communicating between the third device and the fourth device.

7. The method of claim 4, further comprising:
configuring a third plurality of slave nodes to create a third subdomain;
configuring one of the third plurality of slave nodes as a third subdomain master node;
configuring, in a first pass, the first subdomain for negotiating a first communication key and the second subdomain for negotiating a second communication key; and
configuring, in a second pass, the third subdomain for negotiating a third communication key,
wherein the first subdomain includes the first subdomain master node from a first device and a first slave node from a second device, and the second subdomain includes the second subdomain master node from a third device and a second subdomain slave node from a fourth device, and the third subdomain includes the third subdomain master node from the second device and a third subdomain slave node from the third device.

8. The method of claim 1, further comprising:
configuring two or more slave nodes of the first subdomain slave nodes to create a nested subdomain, wherein a slave node of the nested subdomain is configured as a nested subdomain master node and remaining nodes of the nested subdomain are configured as nested subdomain slave nodes; and
communicating instruction data to the nested subdomain master node to communicate one or more task commands to the nested subdomain slave nodes.

9. A computing device, comprising:
a processor operating as a global master node to control and communicate with slave nodes in a domain, the global master node further to:
send instruction data to a first plurality of the slave nodes in the domain to enter a first subdomain;
configure a slave node of the first plurality of the slave nodes as a first subdomain master node;
configure one or more other slave nodes of the first plurality of the slave nodes as first subdomain slave nodes to the first subdomain master node;
communicate instruction data to the first subdomain master node to communicate one or more subdomain tasks for executing by the first subdomain slave nodes; and
resume control of a slave node of the first subdomain slave nodes from the first subdomain master node responsive to the slave node completing one or more subdomain tasks assigned thereto by the first subdomain master node.

10. The computing device of claim 9, wherein:
the first subdomain master node is configured to communicate the instruction data comprising task commands to the first subdomain slave nodes to execute the one or more subdomain tasks.

11. The computing device of claim 9, wherein the global master node and the slave nodes each comprise:
a register stack, the register stack of each slave node configured to receive the instruction data from the global master node,
wherein the instruction data comprises at least one of an ownership control flag value, a role flag value, a subdomain node count, a subdomain slave identification, and a subdomain master identification.

12. The computing device of claim 9, wherein the global master node is further configured to:
configure a second plurality of the slave nodes to create a second subdomain; and configure one of the second plurality of the slave nodes as a second subdomain master node.

13. The computing device of claim 12, wherein the global master node is further configured to:
    configure a third plurality of the slave nodes to create a third subdomain;
    configure one of the third plurality of the slave nodes as a third subdomain master node; and
    configure the first subdomain to negotiate a first communication key, the second subdomain to negotiate a second communication key, and the third subdomain to negotiate a third communication key,
    wherein the first subdomain includes the first subdomain master node from a first device and a first subdomain slave node from a second device, the second subdomain includes the second subdomain master node from the second device and a second subdomain slave node from a third device, and the third subdomain includes the third subdomain master node from the third device and a third subdomain slave node from a fourth device.

14. The computing device of claim 13, wherein the global master node is further configured to configure the first subdomain to negotiate the first communication key, the second subdomain to negotiate the second communication key, and the third subdomain to negotiate the third communication key by:
    configuring the first subdomain master node in the first subdomain to negotiate the first communication key for communicating between the first device and the second device;
    configuring the second subdomain master node and the second subdomain slave node in the second subdomain for negotiating the second communication key for communicating between the second device and the third device; and
    configuring the third subdomain master node and the third subdomain slave node in the third subdomain for negotiating the third communication key for communicating between the third device and the fourth device.

15. The computing device of claim 12, wherein the global master node is further configured to:
    configure a third plurality of the slave nodes to create a third subdomain;
    configure one of the third plurality of the slave nodes as a third subdomain master node;
    configure, in a first pass, the first subdomain to negotiate a first communication key and the second subdomain to negotiate a second communication key; and
    configure, in a second pass, the third subdomain to negotiate a third communication key,
    wherein the first subdomain includes the first subdomain master node from a first device and a first subdomain slave node from a second device, the second subdomain includes the second subdomain master node from a third device and a second subdomain slave node from a fourth device, and the third subdomain includes the third subdomain master node from the second device and a third subdomain slave node from the third device.

16. The computing device of claim 12, wherein the first subdomain master node is configured to:
    configure two or more slave nodes of the first subdomain slave nodes to create a nested subdomain, wherein one slave node of the nested subdomain is configured as a nested subdomain master node and remaining nodes of the nested subdomain are configured as nested subdomain slave nodes; and
    communicate instruction data from the nested subdomain master node to communicate one or more task commands to the nested subdomain slave nodes.

17. A computer system, comprising:
    a first device comprising a processor operating as a global master node to control and communicate with slave nodes in a domain, the global master node further to:
        send instruction data to a first plurality of the slave nodes in the domain to enter a first subdomain;
        configure a slave node of the first plurality of the slave nodes as a first subdomain master node;
        configure one or more other slave nodes of the first plurality of the slave nodes as first subdomain slave nodes to the first subdomain master node;
        communicate instruction data to the first subdomain master node to communicate one or more subdomain tasks for executing by the first subdomain slave nodes; and
        resume control of a slave node of the first subdomain slave nodes from the first subdomain master node responsive to the slave node completing one or more subdomain tasks assigned thereto by the first subdomain master node; and
    a second device communicatively coupled to the first device, the second device comprising one or more slave nodes of the first plurality of the slave nodes.

18. The computer system of claim 17, wherein:
    the global master node is further to create a second subdomain by:
        configuring one slave node of a second plurality of the slave nodes as a second subdomain master node; and
        configuring one or more other slave nodes of the second plurality of the slave nodes as second subdomain slave nodes to the second subdomain master node.

19. The computer system of claim 17, wherein the global master node is further to:
    communicate a first command to set a flag in a first register of the first subdomain master node to a first value to indicate communication channel ownership; and
    communicate a second command to set a flag in a first register of each of the first subdomain slave nodes to the first value to indicate the communication channel ownership,
    wherein the first command comprises an identifier for each of the first subdomain slave nodes and the second command comprises an identifier for the first subdomain master node.

20. The computer system of claim 18, wherein the global master node is further to:
    configure a third plurality of slave nodes to create a third subdomain;
    configure one of the third plurality of slave nodes as a third subdomain master node; and
    configure the first subdomain for negotiating a first communication key, the second subdomain for negotiating a second communication key, and the third subdomain for negotiating a third communication key,
    wherein the first subdomain includes the first subdomain master node from a first device and a first subdomain slave node from a second device, the second subdomain includes the second subdomain master node from the second device and a second subdomain slave node from a third device, and the third subdomain includes the third subdomain master node from the third device and a third subdomain slave node from a fourth device.

* * * * *